UNITED STATES PATENT OFFICE.

A. MYERS, OF SPRINGFIELD, OHIO.

IMPROVED SORGHUM-WINE.

Specification forming part of Letters Patent No. 37,424, dated January 13, 1863; antedated July 23, 1862.

*To all whom it may concern:*

Be it known that I, A. MYERS, of Springfield, in the county of Clarke and State of Ohio, have invented a new and improved preparation from the juice of the Chinese sugar-cane or sorghum, which preparation I denominate "Sorghum-Wine;" and I do hereby that the following is a full, clear, and exact description of the same.

This invention is in a new article of manufacture obtained from the juice of sugar-cane grown in northern latitudes, known as the "Chinese sugar-cane," "*Sorgo sucre,*" "*Holcus saccharatus,*" and "*African imphee,*" by condensing said juice by evaporation to a sweetness of from 15° to 25° Baumé, more or less, and putting it into casks or barrels or vats, where it is left to complete the vinous fermentation, from whence it is drawn off in a proper time and put into new or clean barrels or bottled, ready for the market.

To enable others skilled in the manufacture to fully understand my invention, I will proceed to describe the process which I have followed with success.

The juice of the cane-stalk is expressed in the ordinary way. The juice is evaporated to a density of from 15° to 25° Baumé, more or less, carefully observing not to use any neutralizing agents; or I can use the sirup after it has been reduced by evaporation to a commercial density, and dilute it by adding soft-water—such as rain-water or water containing but a small solution of lime—to a density of from 15° to 25° Baumé, and obtain the same results, being careful to procure sirup which has not been neutralized and has been grown in northern latitudes. I also use the skimmings and washings from the evaporating-pan for the same purpose, clearing it by settling or boiling, then reducing it to a common density, as above described, treating also as above. By this use of skimmings and waste I save in valuable and nutritious wine an amount equal to the cost of manufacturing the sirup. This juice is then placed away in a shed, room, or cellar where the temperature is about 70° or 80° Fahrenheit, when it is allowed to go through the vinous fermentation, which will be completed in from seven to twenty days, according to the degree and regularity of the temperature. These casks must be kept full, that the ferment may work over, or if put up quite pure may be fermented by the siphon process. To assist this fermentaion I use a portion of the white scum which arises in the evaporation.

When the vinous fermentation is completed the barrels, &c., are bunged up tight and placed in a cellar where the temperature is uniform at about 60° Fahrenheit, where they should remain two or three months, when they should be drawn off and put into new or clean barrels or bottles, then placed into a room or cellar where they can have the advantage of a temperature of about 80° Fahrenheit. The wine here should have no air, but be firmly bunged or corked. The effect of this temperature has to do with the ripening and settling of the wine, when in a short time it will become clear as distilled spirits. It can now be drawn off again, if desired. It is improved by removing it from the lees. It will now improve rapidly by age. The color of the wine can be varied to any shade desired by burning a portion of the sirup in any ordinary iron pot, then diluting the burned mass by water, then using more or less of this burned sirup, as it may suit the fancy. I do not claim these specific times only in fermentation. I may vary them according to cirstances, as the wine may need.

The fragrance of this wine is similar to old Madeira, its flavor so similar that the best judges will readily take it either for Madeira or sherry, the majority ranking it as Madeira. The wine is perfectly healthful and agreeable to the stomach, affording in the disease of dyspepsia or weak stomach an agreeable and excellent medicine. It is obvious that the per cent. of alcohol in the wine will vary according to the degree of sweetness of the juice when first put away for fermentation. It will also depend on the completeness of the fermentation. I have found the per cent. of alcohol to be about seventy-five per cent. of the degree of sweetness. For instance, 8° sweetness will yield six per cent. of alcohol. 16° sweetness will yield twelve per cent. alcohol. 20° sweetness will yield sixteen per cent alcohol. Thus by making my wine originally 15° or more in sweetness I secure a per cent. of alcohol in the wine equal to the best Madeira. By securing this per cent. of alcohol to the wine it is capable of more exposure than any other ordinary grape-wine, can resist the elements of destruction incident to commerce, and by experience I have found it capable of more exposure than any other wine without receiving any perceptible damage.

It is believed that the extensive use and manufacture of this wine will conduce greatly to the health of the people and to the cause of saving millions of money to the United States.

The same wine can be made in a similar manner from any of the varieties of sugar-cane grown in the United States.

I now wish to state what I do not claim.

I do not wish to claim or be understood as claiming the manufacture of a fermented cider or drink resembling wine, spoken of by H. S. Olcotte in his treatise on sorghum and imphee, where it is directed to ferment the juice from a degree of sweetness of 8°, 10°, or 12°, or where the juice has been previously neutralized by lime or any other neutralizing agency, or where the fermentation is arrested at any time, either previous to or after fermentation, by the use of neutralizers. Nor do I wish to claim that kind of fermented drink made in the South from the juice of the cane, all this having been long since known; but the wine produced by my process is similar in flavor and fragrance to that imported from the Madeira Islands and France, known as "Madeira" and "sherry" wines.

Having thus fully described my invention, what I claim as new, and desire to secure by Letters Patent, is—

1. Sorghum-wine prepared substantially as described.

2. The process of fermentation substantially as described.

A. MYERS.

Witnesses:
   RICHARDSON GAWLEY,
   JAMES U. GRIDLEY.